(12) United States Patent
Higuchi et al.

(10) Patent No.: US 7,851,547 B2
(45) Date of Patent: Dec. 14, 2010

(54) CURABLE COMPOSITION AND COATED ARTICLE

(75) Inventors: Koichi Higuchi, Annaka (JP); Masaaki Yamaya, Annaka (JP); Hisashi Muramatsu, Kariya (JP); Koichi Chigita, Kariya (JP); Toshio Watanabe, Susono (JP); Takayuki Nagai, Toyota (JP); Toshiro Kondo, Kariya (JP)

(73) Assignees: Shin-Etsu Chemical Co., Ltd., Tokyo (JP); Kabushiki Kaisha Toyota Jidoshokki, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/710,993

(22) Filed: Feb. 27, 2007

(65) Prior Publication Data
US 2007/0212557 A1    Sep. 13, 2007

(30) Foreign Application Priority Data
Feb. 28, 2006    (JP)    .............................. 2006-051756

(51) Int. Cl.
C08L 83/00    (2006.01)
C08L 33/06    (2006.01)
C08K 5/34    (2006.01)
C08F 220/12    (2006.01)
B32B 9/04    (2006.01)

(52) U.S. Cl. ...................... 524/588; 524/100; 524/858; 524/560; 428/447

(58) Field of Classification Search ................. 524/100, 524/588, 858, 859; 428/447, 412, 164, 448; 427/164, 204, 387
See application file for complete search history.

(56) References Cited

U.S. PATENT DOCUMENTS

| | | | |
|---|---|---|---|
| 4,353,959 A | 10/1982 | Olson et al. | |
| 4,801,658 A * | 1/1989 | Furukawa et al. | ........... 525/450 |
| 4,910,255 A * | 3/1990 | Wakabayashi et al. | ...... 525/100 |
| 5,021,266 A | 6/1991 | Yamaya et al. | |
| 5,250,359 A | 10/1993 | Funaki et al. | |
| 5,498,666 A * | 3/1996 | Nambu et al. | ................ 525/100 |
| 6,040,009 A * | 3/2000 | Marutani et al. | ............ 427/241 |
| 6,726,997 B2 | 4/2004 | Tamori et al. | |
| 6,855,768 B2 | 2/2005 | Matsumura et al. | |
| 2003/0236327 A1 * | 12/2003 | Leppard et al. | ............. 524/100 |
| 2004/0071998 A1 * | 4/2004 | Higuchi et al. | .............. 428/504 |
| 2007/0104956 A1 * | 5/2007 | Grandhee | .................... 428/412 |

FOREIGN PATENT DOCUMENTS

| | | |
|---|---|---|
| EP | 1070750 A2 | 1/2001 |
| EP | 1122278 A2 | 8/2001 |
| EP | 1408082 A2 | 4/2004 |
| JP | 56-92059 A | 7/1981 |
| JP | 1-149878 A | 6/1989 |
| JP | 8-151415 A | 6/1996 |
| JP | 3102696 B2 | 8/2000 |
| JP | 2001-47574 A | 2/2001 |
| JP | 2001-114841 A | 4/2001 |
| JP | 2001-214122 A | 8/2001 |
| JP | 2002-332354 A | 11/2002 |
| JP | 2004-131549 A | 4/2004 |
| JP | 2004-137310 A | 5/2004 |

OTHER PUBLICATIONS

Database WPI Week 200318, Derwent Publications Ltd., London, GB; AN 2003-178221, XP002435438 & JP 2002 129097 A (Kaneka Corp) May 9, 2002.
Japanese Office Action issued Jul. 21, 2010, in Japanese Application No. 2006-051756.

* cited by examiner

*Primary Examiner*—Vasu Jagannathan
*Assistant Examiner*—Alexander C Kollias
(74) *Attorney, Agent, or Firm*—Birch, Stewart, Kolasch & Birch, LLP

(57) ABSTRACT

A curable composition comprises (A) an organic/inorganic composite in which a hydrolyzable silyl group and/or SiOH group-containing polysiloxane is bonded to a vinyl polymer through a Si—C bond, and (B) an organic UV absorber having a molecular weight of at least 500 and a weight retentivity of at least 95% when held at 150° C. for 24 hours in an open state. The curable composition is coated and cured to an article, whereby the article is endowed with satisfactory weathering resistance while minimizing coloration or degradation.

11 Claims, No Drawings

US 7,851,547 B2

CURABLE COMPOSITION AND COATED ARTICLE

CROSS-REFERENCE TO RELATED APPLICATION

This non-provisional application claims priority under 35 U.S.C. §119(a) on Patent Application No. 2006-051756 filed in Japan on Feb. 28, 2006, the entire contents of which are hereby incorporated by reference.

TECHNICAL FIELD

This invention relates to a curable composition comprising a low-volatile ultraviolet (UV) absorber and an organic/inorganic composite in which a polysiloxane is bonded to a vinyl polymer through a Si—C bond, and an article having the composition coated and cured to a substrate.

BACKGROUND ART

As a substitute for transparent flat glass, transparent materials having non-shattering nature or greater shatter resistance than glass have been widely used in these years. For example, plastic substrates, especially polycarbonate resins, due to their excellent properties including transparency, impact resistance, and heat resistance, are currently used as structural members in place of glass, in various applications including windows in buildings and vehicles, meter covers and the like.

However, it is strongly desired to improve the surface properties of molded polycarbonate resins because their surface properties like mar resistance and weatherability are poor as compared with glass. Nowadays, polycarbonate resins intended for use as vehicle windows, road noise barriers or the like are desired to withstand weathering over ten years.

Known means for improving the weatherability of molded polycarbonate resins include lamination of an acrylic resin film having good weatherability to the surface of polycarbonate resin substrates, and provision of a UV absorber-containing resin layer on the polycarbonate resin surface by coextrusion or the like.

Also, known means for improving the mar resistance of molded polycarbonate resins include coating of thermosetting resins such as polyorganosiloxane and melamine resins and coating of polyfunctional acrylic photo-curable resins.

Further, a method of producing a transparent part having both weatherability and mar resistance is disclosed in JP-A 56-92059 and JP-A 1-149878. UV-absorbing transparent articles are known comprising a resin substrate, an undercoat layer having a large loading of UV absorber added, and a protective coating of a colloidal silica-laden polysiloxane coating composition formed on the undercoat layer.

However, the heavy loading of UV absorber into the undercoat layer gives rise to several problems. The heavy loading can adversely affect the adhesion of the undercoat layer to the underlying substrate or the overlying protective coating of a colloidal silica-laden polysiloxane coating composition. The UV absorber will escape from the undercoat composition via volatilization during heat curing step. On outdoor use over a long period of time, the UV absorber will gradually bleed out, exerting detrimental effects like cracking and whitening or yellowing. It is unacceptable from the standpoint of mar resistance to add a large amount of UV absorber to the colloidal silica-laden polysiloxane coating composition of which the overlying protective coating is made.

It is known from JP-A 8-151415 to form a protective coating on the surface of a synthetic resin or the like using a mixture of a benzotriazole or benzophenone-derived UV-absorbing vinyl monomer and a vinyl monomer copolymerizable therewith as a coating component. This protective coating, however, has only limited mar resistance since it is made of a vinyl polymer.

It is also known to form a coating on a resin substrate to produce a multilayer resin article using a copolymer of a benzotriazole or benzophenone-derived UV-absorbing vinyl monomer, an alkoxysilyl-containing vinyl monomer, and a vinyl monomer copolymerizable therewith as a coating component, the coating having adhesion to the resin substrate and imparting weatherability to the article. See Japanese Patent No. 3102696, JP-A 2001-047574, JP-A 2001-114841, and JP-A 2001-214122.

In these patents, coated articles having mar resistance and weatherability are manufactured by using a copolymer-containing composition to form an undercoat, and forming a colloidal silica-laden polysiloxane resin coating on the undercoat. These articles are noticeably improved in the adhesion of the polysiloxane resin coating and weatherability. Since the crosslinking network formation of alkoxysilyl groups in the undercoat does not proceed to a full extent, post-crosslinking of residual (or uncured) alkoxysilyl or hydroxysilyl groups can occur with the passage of time, inviting the likelihood of introducing strain to the coating and thus causing defects like cracks and delamination. That is, the coated articles are still insufficient in long-term weathering. In addition, when the coating is exposed to rapid changes of the ambient temperature, especially changes at relatively high temperature, the likelihood of crack occurrence by post-crosslinking is increased.

DISCLOSURE OF THE INVENTION

An object of the invention is to provide a curable composition capable of forming a protective coating having good weatherability and free from the drawbacks of cracking, delamination and yellowing on long-term use, and a coated article using the same.

The inventors have found that the above and other objects are attained by a curable composition comprising (A) an organic/inorganic composite in which a hydrolyzable silyl group and/or SiOH group-containing polysiloxane is bonded to a vinyl polymer through a Si—C bond, and (B) an organic UV absorber having a molecular weight of at least 500 and a weight retentivity of at least 95% when held at 150° C. for 24 hours in an open state. The composition is coated onto a substrate to form a UV-absorbing coating for thereby imparting long-term weatherability to the coated article. By further disposing a silicone hard resin coating on the composition coating, both long-term weatherability and mar resistance are imparted.

Specifically, the inventors made a study on a curable composition forming a coating capable of imparting long-term weatherability to molded parts of thermoplastic resins, typically polycarbonate. It has been found that if (B) an organic UV absorber having a molecular weight of at least 500 and a weight retentivity of at least 95% when held at 150° C. for 24 hours in an open state is used as a composition constituent, then little of this UV absorber volatilizes off from the coating during high-temperature treatment for curing and little of the UV absorber leaches out or volatilizes off with the passage of time.

It has also been found that if (A) an organic/inorganic composite in which a hydrolyzable silyl group and/or SiOH group-containing polysiloxane is bonded to a vinyl polymer through a Si—C bond is used as a composition constituent, then siloxane crosslinking occurs between silicon-containing groups to form a dense three-dimensional siloxane crosslinked network. As a result, the migration of the UV absorber (B) to the coating surface is substantially prevented, eliminating an appearance whitening phenomenon and a loss of adhesion. The dissolution of the UV absorber into water, solvents or the like is prevented, so that the initial loading is maintained over a long term, preventing the UV-absorbing effect from declining with the passage of time. The UV absorber does not volatilize off from the coating during high-temperature treatment for curing.

When an organopolysiloxane based hard protective coating layer is disposed on the coating of the curable composition of the invention, the hydrolyzable silyl groups and/or SiOH groups in the organic/inorganic composite (A) have reactivity with the organopolysiloxane based hard protective coating layer so that its adhesion is improved. The crosslinking of the hydrolyzable silyl groups and/or SiOH groups improves heat resistance, preventing cracks from occurring upon changes of the ambient temperature. Since the hydrolyzable silyl group and/or SiOH group is separated relatively far apart from the polymer main chain by a polysiloxane chain, full crosslinking reaction occurs during curing, eventually minimizing post-crosslinking of residual hydrolyzable silyl groups and/or SiOH groups, and preventing the occurrence of cracks with the passage of time.

Accordingly, the present invention provides a curable composition capable of forming a weather-resistant coating and an article coated with the composition.

[1] A curable composition comprising (A) an organic/inorganic composite in which a hydrolyzable silyl group and/or SiOH group-containing polysiloxane is bonded to a vinyl polymer through a Si—C bond, and (B) an organic UV absorber having a molecular weight of at least 500 and a weight retentivity of at least 95% when held at 150° C. for 24 hours in an open state.

[2] The curable composition of [1], wherein said organic UV absorber (B) is a triazole compound, a triazine compound or a mixture thereof.

[3] The curable composition of [1] or [2], wherein said organic/inorganic composite (A) is obtained through copolymerization of monomeric components comprising (a-1) a vinyl monomer having a hydrolyzable silyl group and/or SiOH group-containing polysiloxane member bonded thereto through a C—Si bond and (a-3) another monomer copolymerizable therewith.

[4] The curable composition of [1] or [2], wherein said organic/inorganic composite (A) is obtained through partial hydrolytic condensation of a vinyl polymer, which is obtained through copolymerization of monomeric components comprising (a-2) a vinyl monomer having a hydrolyzable silyl group and/or SiOH group bonded thereto through a C—Si bond and (a-3) another monomer copolymerizable therewith, and an organosilicon compound containing a hydrolyzable silyl group and/or SiOH group in the molecule.

[5] The curable composition of [3] or [4], wherein said other monomer (a-3) comprises a UV-absorbing group-containing vinyl monomer.

[6] The curable composition of any one of [1] to [5], wherein the polysiloxane in said organic/inorganic composite (A) contains nitrogen atoms in the molecule.

[7] The curable composition of any one of [1] to [6], further comprising (C) a vinyl polymer containing hydrolyzable silyl groups and/or SiOH groups.

[8] The curable composition of any one of [1] to [7], further comprising (D) an organosilicon compound containing a nitrogen atom and an alkoxysilyl group in the molecule.

[9] The curable composition of any one of [1] to [8], further comprising (E) a thermoplastic vinyl resin.

[10] An article comprising a substrate and a coating formed thereon by coating the curable composition of any one of [1] to [9] and curing through siloxane crosslinking.

[11] An article comprising a substrate, an undercoat formed on the substrate by coating and curing the curable composition of any one of [1] to [9], and a silicone hard coating disposed on the surface of the undercoat.

BENEFITS OF THE INVENTION

The curable composition of the invention forms a UV-absorbing coating having improved water resistance and solvent resistance, because siloxane crosslinking prevents the UV absorber from running out with the passage of time, and the organic/inorganic composite having weathering resistance is used as a binder. When the curable composition is coated and cured to a less weather-resistant article, the article is endowed with satisfactory weathering resistance while minimizing coloration or degradation of the article.

Plastic articles, typically polycarbonate resin articles, when coated with the curable composition of the invention, are endowed with improved weathering resistance while maintaining transparency. Further lamination of a polysiloxane hard coating on the coating enables to impart mar resistance and chemical resistance additionally. The coated articles thus find outdoor use as windows and windshields in transporting vehicles such as automobiles and aircraft, building windows, road noise barriers, and the like.

DESCRIPTION OF THE PREFERRED EMBODIMENT

The singular forms "a," "an" and "the" include plural references unless the context clearly dictates otherwise. The notation (Cn-Cm) means a group containing from n to m carbon atoms per group.

The curable composition of the invention comprises as essential components (A) an organic/inorganic composite in which a hydrolyzable silyl group and/or SiOH group-containing polysiloxane is bonded to a vinyl polymer through a Si—C bond, and (B) an organic UV absorber having a molecular weight of at least 500 and a weight retentivity of at least 95% when held at 150° C. for 24 hours in an open state.

Component A

The organic/inorganic composite (A) in which a hydrolyzable silyl group and/or SiOH group-containing polysiloxane is bonded to a vinyl polymer through a Si—C bond is not particularly limited as long as a hydrolyzable silyl group and/or SiOH group-containing polysiloxane is bonded to a vinyl polymer main chain through a Si—C bond. The organic/inorganic composite (A) or polymer may be obtained by any of the following reactions.

<Reaction Scheme 1>

It is obtained through copolymerization of monomeric components comprising (a-1) a vinyl monomer having a hydrolyzable silyl group and/or SiOH group-containing polysiloxane bonded thereto through a C—Si bond and (a-3) another monomer copolymerizable therewith.

<Reaction Scheme 2>

It is obtained through partial hydrolytic condensation of a vinyl polymer, which is obtained through copolymerization of monomeric components comprising (a-2) a vinyl monomer having a hydrolyzable silyl group and/or SiOH group bonded thereto through a C—Si bond and (a-3) another monomer copolymerizable therewith, and an organosilicon compound containing a hydrolyzable silyl group and/or SiOH group in the molecule.

The vinyl monomer (a-1) having a hydrolyzable silyl group and/or SiOH group-containing polysiloxane bonded thereto through a Si—C bond is not particular limited as long as it has at least one vinyl-polymerizable functional group, at least one hydrolyzable silyl group and/or SiOH group, and at least two silicon atoms in the molecule.

Suitable vinyl-polymerizable functional groups include organic groups of 2 to 12 carbon atoms containing vinyl, vinyloxy, (meth)acryloxy or (α-methyl)styryl group. Illustrative examples include vinyl, 5-hexenyl, 9-decenyl, vinyloxymethyl, 3-vinyloxypropyl, (meth)acryloxymethyl, 3-(meth)acryloxypropyl, 11-(meth)acryloxyundecyl, vinylphenyl (or styryl), isopropenylphenyl (or α-methylstyryl), and vinylphenylmethyl (or vinylbenzyl). Inter alia, (meth)acryloxypropyl is preferred for reactivity and availability.

Suitable hydrolyzable groups include alkoxy groups such as methoxy, ethoxy, propoxy, isopropoxy, butoxy, isobutoxy, sec-butoxy, and tert-butoxy, acyloxy groups such as phenoxy and acetyloxy, oxime groups such as butanoxime, amino groups such as amino and methylamino, and halogen groups such as chloro. Inter alia, alkoxy groups such as methoxy and ethoxy are preferred for easy control of hydrolysis and availability.

Substituent groups other than the foregoing include alkyl groups such as methyl, ethyl, propyl, hexyl and decyl, and phenyl groups. Methyl and phenyl are preferred for availability.

The vinyl monomer (a-1) having a hydrolyzable silyl group and/or SiOH group-containing polysiloxane bonded thereto through a Si—C bond may be obtained through condensation or cohydrolytic condensation of a silane compound having a vinyl polymerizable functional group and a hydrolyzable group or a (partial) hydrolyzate thereof with an organosilicon compound having a hydrolyzable group or SiOH group or a (partial) hydrolyzate or condensate thereof.

Examples of the silane compound having a vinyl polymerizable functional group and a hydrolyzable group are those compounds which are illustrated for (a-2) later. Examples of the organosilicon compound having a hydrolyzable group or SiOH group include $Si(OCH_3)_4$, $Si(OCH_2CH_3)_4$, MeO—Si(Me)$_2$—O—Si(OMe$_3$)$_3$, and MeO—Si(Me)$_2$—O—Si(Me)$_2$—O—Si(OMe$_3$)$_3$ wherein Me stands for methyl.

Illustrative examples of the vinyl monomer (a-1) having a hydrolyzable silyl group and/or SiOH group-containing polysiloxane bonded thereto through a Si—C bond are given below.

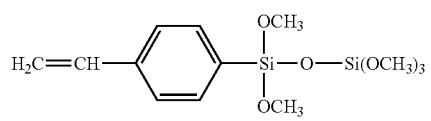

-continued

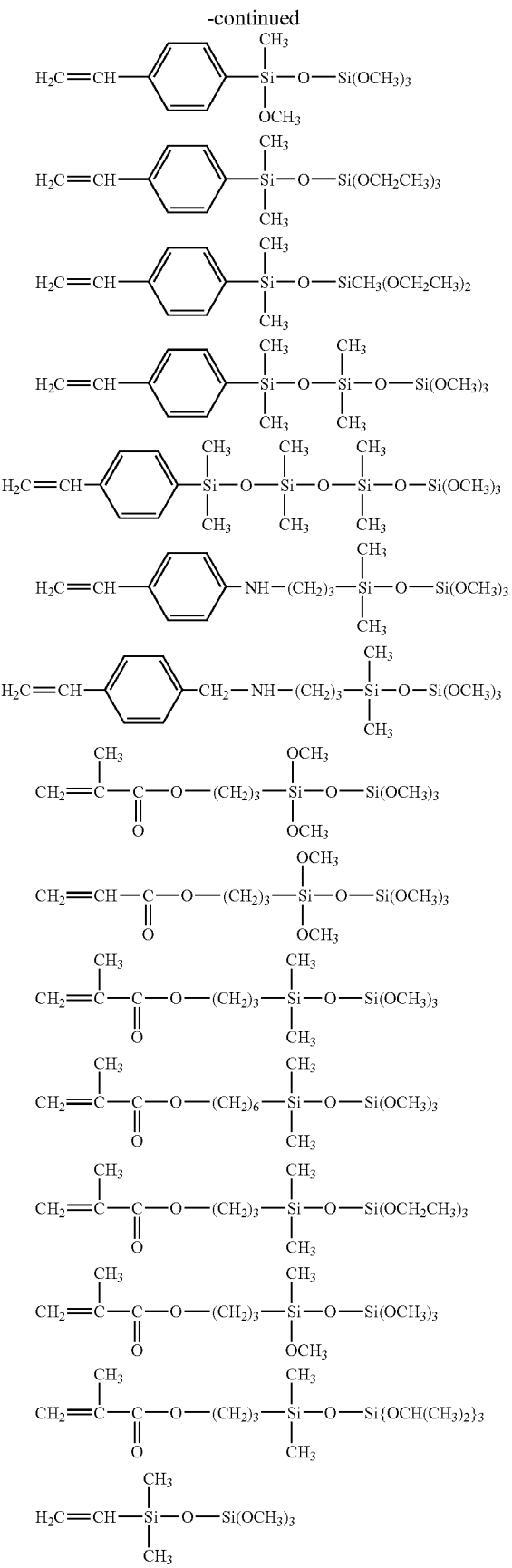

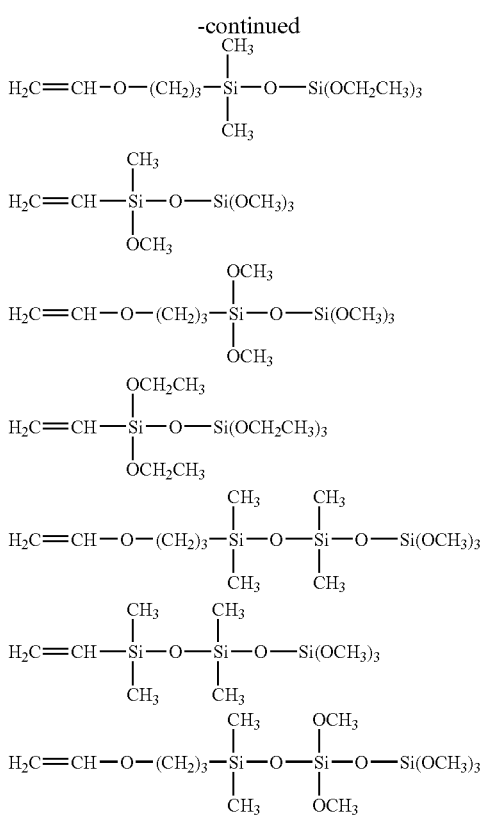

Alternatively, the monomer may be obtained by reacting a polysiloxane having a haloalkyl group (e.g., chloromethyl, chloropropyl or bromopropyl) and a hydrolyzable group with sodium (meth)acrylate or potassium (meth)acrylate.

It may also be obtained by reacting a polysiloxane having a hydrolyzable group with a Grignard reagent such as vinyl phenyl magnesium chloride.

The polysiloxane is composed of units of at least one type, selected from M units having three organic substituent groups bonded to silicon through a Si—C bond, D units having two organic substituent groups, T units having one organic substituent group, and Q units free of such organic substituent groups. The inclusion of T and Q units is preferred particularly for improving crosslinking properties. As to the degree of polymerization, the preferred polysiloxane contains 2 to 20 silicon atoms, more preferably 2 to 10 silicon atoms.

In the organic/inorganic composite (A), the vinyl monomer (a-1) having a hydrolyzable silyl group and/or SiOH group-containing polysiloxane bonded thereto through a Si—C bond is preferably present in a range of 1 to 50% by weight, more preferably 3 to 40% by weight of the copolymer composition. With less than 1 wt %, formation of siloxane network due to crosslinking between alkoxy groups may be insufficient, failing to prevent the UV absorber (B) from migrating to the surface or running out or to improve the heat resistance and durability of a coating. In excess of 50 wt %, the coating may become hard due to an increased crosslinking density, causing such drawbacks as a decline of adhesion, retention of more unreacted hydrolyzable groups or SiOH groups, post-crosslinking with the passage of time, and crack occurrence.

The vinyl monomer (a-2) having a hydrolyzable silyl group and/or SiOH group bonded thereto through a C—Si bond is not particularly limited as long as it is a compound having at least one hydrolyzable silyl group and at least one unsaturated double bond in the molecule or a hydrolyzate thereof in SiOH form. Illustrative examples of the vinyl monomer (a-2) include methacryloxypropyltrimethoxysilane, methacryloxypropylmethyldimethoxysilane, methacryloxypropyldimethylmethoxysilane, methacryloxypropyltriethoxysilane, methacryloxymethyltrimethoxysilane, methacryloxyundecyltrimethoxysilane, acryloxypropyltrimethoxysilane, acryloxypropylmethyldimethoxysilane, acryloxypropyldimethylmethoxysilane, acryloxypropyltriethoxysilane, acryloxymethyltrimethoxysilane, acryloxyundecyltrimethoxysilane, vinyltrimethoxysilane, vinyltriethoxysilane, vinylmethyldimethoxysilane, allyltrimethoxysilane, styryltrimethoxysilane, styrylmethyldimethoxysilane, and styryltriethoxysilane. Of these, methacryloxypropyltrimethoxysilane, methacryloxypropylmethyldimethoxysilane, methacryloxypropyldimethylmethoxysilane, acryloxypropyltrimethoxysilane, and acryloxypropylmethyldimethoxysilane are preferred for availability, ease of handling, crosslinking density and reactivity.

The vinyl monomer (a-2) having a hydrolyzable silyl group and/or SiOH group bonded thereto through a C—Si bond is copolymerized with another monomer and then converted through partial cohydrolytic condensation with an organosilicon compound having a hydrolyzable silyl group and/or SiOH group in the molecule, into a vinyl polymer (A) having a hydrolyzable silyl group and/or SiOH group-containing polysiloxane member bonded to a side chain through a C—Si bond.

The vinyl monomer (a-2) having a hydrolyzable silyl group and/or SiOH group bonded thereto through a C—Si bond is preferably present in a range of 1 to 50% by weight, more preferably 3 to 40% by weight of the copolymer composition. With less than 1 wt %, formation of siloxane network due to crosslinking between alkoxy groups may be insufficient, failing to prevent the UV absorber (B) from migrating to the surface or flowing out or to improve the heat resistance and durability of a coating. In excess of 50 wt %, the coating may become hard due to an increased crosslinking density, causing such drawbacks as a decline of adhesion, retention of more unreacted hydrolyzable groups or hydroxyl groups, post-crosslinking with the passage of time, and crack occurrence.

The other monomer (a-3) copolymerizable with the foregoing monomer (a-1) or (a-2) is not particularly limited as long as it is copolymerizable. Suitable examples include (meth)acrylic monomers having a UV absorbing group, (meth)acrylic monomers having a cyclic hindered amine structure, (meth)acrylates, (meth)acrylonitriles, (meth)acrylamides, alkyl vinyl ethers, alkyl vinyl esters, styrene, and derivatives thereof.

Suitable (meth)acrylic monomers having a UV absorbing group in the molecule include benzotriazole compounds of the general formula (1) and benzophenone compounds of the general formula (2), shown below.

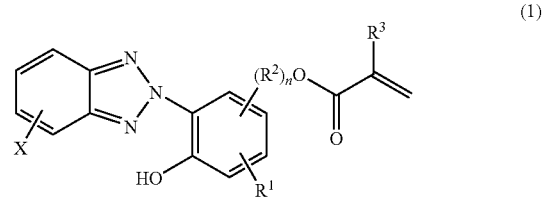

(1)

Herein X is hydrogen or chlorine; R¹ is hydrogen, methyl, or a tertiary $C_4$-$C_8$ alkyl group; R² is a straight or branched $C_2$-$C_{10}$ alkylene group; R³ is hydrogen or methyl; and n is 0 or 1.

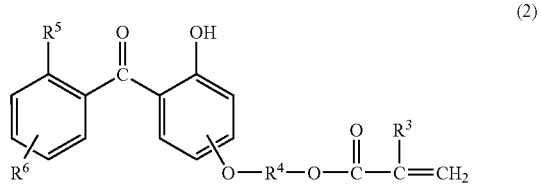

(2)

Herein R³ is as defined above; R⁴ is a substituted or unsubstituted, straight or branched $C_2$-$C_{10}$ alkylene group; R⁵ is hydrogen or hydroxyl; and R⁶ is hydrogen, hydroxyl or a $C_1$-$C_6$ alkoxy group.

In formula (1), suitable tertiary $C_4$-$C_8$ alkyl groups represented by R¹ include tert-butyl, tert-pentyl, tert-hexyl, tert-heptyl, tert-octyl, and di-tert-octyl. Suitable straight or branched $C_2$-$C_{10}$ alkylene groups represented by R² include ethylene, trimethylene, propylene, tetramethylene, 1,1-dimethyltetramethylene, butylene, octylene, and decylene.

In formula (2), suitable straight or branched $C_2$-$C_{10}$ alkylene groups represented by R⁴ are the same as exemplified for R² or substituted forms thereof in which some hydrogen atoms are substituted by halogen atoms. Suitable alkoxy groups represented by R⁶ include methoxy, ethoxy, propoxy, and butoxy.

Illustrative, non-limiting examples of the benzotriazole compounds of formula (1) include 2-(2'-hydroxy-5'-(meth)acryloxyphenyl)-2H-benzotriazole, 2-(2'-hydroxy-3'-tert-butyl-5'-(meth)acryloxymethylphenyl)-2H-benzotriazole, 2-[2'-hydroxy-5'-(2-(meth)acryloxyethyl)phenyl]-2H-benzotriazole, 2-[2'-hydroxy-3'-tert-butyl-5'-(2-(meth)acryloxyethyl)-phenyl]-5-chloro-2H-benzotriazole, and 2-[2'-hydroxy-3'-methyl-5'-(8-(meth)acryloxyoctyl)phenyl]-2H-benzotriazole.

Illustrative, non-limiting examples of the benzophenone compounds of formula (2) include 2-hydroxy-4-(2-(meth)acryloxyethoxy)benzophenone, 2-hydroxy-4-(4-(meth)acryloxybutoxy)benzophenone, 2,2'-dihydroxy-4-(2-(meth)acryloxyethoxy)benzophenone, 2,4-dihydroxy-4'-(2-(meth)acryloxyethoxy)benzophenone, 2,2',4-trihydroxy-4'-(2-(meth)acryloxyethoxy)benzophenone, 2-hydroxy-4-(3-(meth)acryloxy-2-hydroxypropoxy)benzophenone, and 2-hydroxy-4-(3-(meth)acryloxy-1-hydroxypropoxy)benzophenone.

The preferred UV-absorbing vinyl monomers are benzotriazole compounds of formula (1), with 2-[2'-hydroxy-5'-(2-(meth)acryloxyethyl)phenyl]-2H-benzotriazole being most preferred. The UV-absorbing vinyl monomers may be used alone or in admixture.

Illustrative, non-limiting examples of the (meth)acrylic monomers having a cyclic hindered amine structure include 2,2,6,6-tetramethyl-4-piperidinyl methacrylate and 1,2,2,6,6-pentamethyl-4-piperidinyl methacrylate. These light stabilizers may be used alone or in admixture.

Illustrative, non-limiting examples of the (meth)acrylates and derivatives thereof include (meth)acrylic esters of monohydric alcohols such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, n-pentyl (meth)acrylate, isopentyl (meth)acrylate, n-hexyl (meth)acrylate, isohexyl (meth)acrylate, n-heptyl (meth)acrylate, isoheptyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-undecyl (meth)acrylate, n-dodecyl (meth)acrylate, lauryl (meth)acrylate, palmityl (meth)acrylate, stearyl (meth)acrylate, cyclohexyl (meth)acrylate, 4-methylcyclohexyl (meth)acrylate, 4-t-butylcyclohexyl (meth)acrylate, isobornyl (meth)acrylate, dicyclopentanyl (meth)acrylate, dicyclopentenyloxyethyl (meth)acrylate, and benzyl (meth)acrylate; (meth)acrylic esters of alkoxy(poly)alkylene glycol such as 2-methoxyethyl (meth)acrylate, 2-methoxypropyl (meth)acrylate, 3-methoxypropyl (meth)acrylate, 2-methoxybutyl (meth)acrylate, 3-methoxybutyl (meth)acrylate, 4-methoxybutyl (meth)acrylate, methoxypolyethylene glycol (meth)acrylate (the number of ethylene glycol units being 2 to 20, for example), and methoxypolypropylene glycol (meth)acrylate (the number of propylene glycol units being 2 to 20, for example); mono(meth)acrylic esters of polyhydric alcohols such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, glycerin mono(meth)acrylate, pentaerythritol mono(meth)acrylate, polyethylene glycol mono(meth)acrylate (the number of ethylene glycol units being 2 to 20, for example), and polypropylene glycol mono(meth)acrylate (the number of propylene glycol units being 2 to 20, for example); poly(meth)acrylic esters of polyhydric alcohols such as ethylene glycol di(meth)acrylate, propylene glycol di(meth)acrylate, butylene glycol di(meth)acrylate, glycerin di(meth)acrylate, glycerin tri(meth)acrylate, pentaerythritol di(meth)acrylate, pentaerythritol tetra(meth)acrylate, 1,4-cyclohexane diol di(meth)acrylate, polyethylene glycol di(meth)acrylate (the number of ethylene glycol units being 2 to 20, for example), and polypropylene glycol di(meth)acrylate (the number of propylene glycol units being 2 to 20, for example); (poly)esters of non-polymeric polybasic acids with hydroxylalkyl (meth)acrylates such as mono[2-(meth)acryloyloxyethyl] succinate, di[2-(meth)acryloyloxyethyl] succinate, mono[2-(meth)acryloyloxyethyl] adipate, di[2-(meth)acryloyloxyethyl] adipate, mono[2-(meth)acryloyloxyethyl] phthalate, and di[2-(meth)acryloyloxyethyl] phthalate; amino-containing (meth)acrylates such as 2-aminoethyl (meth)acrylate, 2-(N-methylamino)ethyl (meth)acrylate, 2-(N,N-dimethylamino) ethyl (meth)acrylate, 2-(N-ethylamino)ethyl (meth)acrylate, 2-(N,N-diethylamino)ethyl (meth)acrylate, 3-(N,N-dimethylamino)propyl (meth)acrylate, and 4-(N,N-dimethylamino) butyl (meth)acrylate; and epoxy-containing (meth)acrylic esters such as glycidyl (meth)acrylate.

Examples of suitable (meth)acrylonitrile derivatives include α-chloroacrylonitrile, α-chloromethylacrylonitrile, α-trifluoromethylacrylonitrile, α-methoxyacrylonitrile, α-ethoxyacrylonitrile, and vinylidene cyanide. Examples of suitable (meth)acrylamide derivatives include N-methyl (meth)acrylamide, N,N-dimethyl(meth)acrylamide, N-ethyl (meth)acrylamide, N,N-diethyl(meth)acrylamide, N-methoxy(meth)acrylamide, N,N-dimethoxy(meth)acrylamide, N-ethoxy(meth)acrylamide, N,N-diethoxy(meth)acrylamide, diacetone(meth)acrylamide, N-methylol(meth)acrylamide, N-(2-hydroxyethyl)(meth)acrylamide, N,N-dimethylaminomethyl(meth)acrylamide, N-(2-dimethylamino)ethyl (meth)acrylamide, N,N'-methylenebis(meth)acrylamide, and N,N'-ethylenebis(meth)acrylamide.

Examples of suitable alkyl vinyl ethers include methyl vinyl ether, ethyl vinyl ether, butyl vinyl ether, and hexyl vinyl ether. Examples of suitable alkyl vinyl esters include vinyl formate, vinyl acetate, vinyl acrylate, vinyl butyrate, vinyl caproate, and vinyl stearate. Examples of styrene and derivatives thereof include styrene, α-methylstyrene and vinyltoluene.

Of the foregoing monomers, (meth)acrylates are preferred. More preferred are methyl (meth)acrylate, ethyl (meth)acrylate, isopropyl (meth)acrylate, n-butyl (meth)acrylate, isobutyl (meth)acrylate, n-hexyl (meth)acrylate, 2-ethylhexyl (meth)acrylate, isononyl (meth)acrylate, lauryl (meth)acrylate, cyclohexyl (meth)acrylate, 4-methylcyclohexyl (meth)acrylate, 4-t-butylcyclohexyl (meth)acrylate, isobornyl (meth)acrylate, dicyclopentanyl (meth)acrylate, dicyclopentenyloxyethyl (meth)acrylate, and the like.

The other copolymerizable monomers (a-3) may be used alone or in admixture of two or more.

In the organic/inorganic composite (A), the other copolymerizable monomer (a-3) is preferably present in a range of 50 to 99% by weight, more preferably 60 to 97% by weight of the copolymer composition. In particular, it is preferred for improved weatherability to use the (meth)acrylic monomer having a UV-absorbing group and/or the (meth)acrylic monomer having a cyclic hindered amine structure as a comonomer. This (meth)acrylic monomer is preferably used in a range of 0 to 50% by weight, and if used, more preferably 1 to 30% by weight of the copolymer composition. Amounts in excess of 30 wt % may reduce the adhesion of the coating or cause defective appearance such as whitening to the coating.

In the organic/inorganic composite (A), copolymerization reaction of the vinyl monomer (a-1) having a hydrolyzable silyl group and/or SiOH group bonded thereto through a C—Si bond or the vinyl monomer (a-2) having a hydrolyzable silyl group and/or SiOH group bonded thereto through a C—Si bond with the other copolymerizable monomer (a-3) may be carried out by adding a radical polymerization initiator to a solution of these monomers, and heating the solution. The initiator is selected from peroxides such as dicumyl peroxide and benzoyl peroxide and azo compounds such as azobisisobutyronitrile.

The vinyl polymer should preferably have a weight average molecular weight (Mw) of 1,000 to 300,000, more preferably 5,000 to 250,000, as measured by gel permeation chromatography (GPC) versus polystyrene standards.

Described below is the organosilicon compound containing a hydrolyzable silyl group and/or SiOH group in the molecule used in <Reaction scheme 2> for the synthesis of the organic/inorganic composite (A). The organosilicon compound used herein is not particularly limited as long as it contains a hydrolyzable silyl group and/or SiOH group in the molecule.

The organosilicon compounds may have substituent groups. Suitable substituent groups include alkyl groups such as methyl, ethyl, propyl and decyl, phenyl groups, and alkyl groups having various organic functional groups (other then vinyl polymerizable groups) such as epoxy functional groups, amino functional groups, mercapto functional groups, acid anhydride functional groups, isocyanate functional groups, ketimine functional groups, isocyanurate ring-containing groups, and urea groups. For adhesion to substrates and a catalytic function to hydrolysis and condensation, nitrogen-containing substituent groups are preferred. Specifically, groups containing primary, secondary and tertiary amino groups, isocyanurate ring-containing groups, urea groups and isocyanate groups are preferred. The hydrolyzable groups may be the same as described previously.

The organosilicon compounds used herein may range from monomers having one silicon atom to compounds containing 2 to 20 silicon atoms. The compounds containing a plurality of silicon atoms may have a polysiloxane skeleton in which silicon atoms are linked via a siloxane bond, or a skeleton in which silicon atoms are linked via an optionally branched crosslinking group other than the siloxane bond. Suitable crosslinking groups other than siloxane are divalent or trivalent organic groups including $C_1$-$C_{10}$ alkylene groups which may be separated by an amino group, sulfur atom or oxygen atom, phenylene groups, xylylene groups, and isocyanurate rings.

For adhesion, amino-functional silane derivatives obtained through reaction of an amino-functional silane with an epoxy-functional silane, and isocyanurate ring-containing silanes are preferred.

Component B

Another essential component in the curable composition of the invention is (B) an organic UV absorber having a molecular weight of at least 500 and a weight retentivity of at least 95% when held at 150° C. for 24 hours in an open state. No particular limits are imposed on the organic UV absorber (B) as long as it has a molecular weight of at least 500, preferably 550 to 100,000 and a weight retentivity of at least 95%, preferably at least 96%, when held at 150° C. for 24 hours in an open state.

Suitable UV absorbers include triazole compounds and triazine compounds, examples of which include 2,4-bis(2,4-dimethylphenyl)-6-(2-hydroxy-4-isooctyloxy-phenyl)-1,3,5-triazine, 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine, 2,4-bis(2-hydroxy-4-butyloxyphenyl)-6-(2,4-bisbutyloxy-phenyl)-1,3,5-triazine, 2-[2-hydroxy-4-(1-octyloxycarbonylethoxy)phenyl]-4,6-bis(4-phenylphenyl)-1,3,5-triazine, β-[3-(2H-benzotriazol-2-yl)-4-hydroxy-5-tert-butylphenyl]-propionic acid poly(ethylene glycol)(300) ester, bis{β-[3-(2H-benzotriazol-2-yl)-4-hydroxy-5-tert-butyl-phenyl]-propionic acid}poly(ethylene glycol)(300) ester, 2,2'-methylene-bis[4-(1,1,3,3-tetramethylbutyl)-6-[(2H-benzotriazol-2-yl)phenol]], (co)polymers of 2-hydroxy-4-(2-acryloxyethoxy)benzophenone, and (co)polymers of 2-(2'-hydroxy-5'-methacryloxyethylphenyl)-2H-benzotriazole.

Of these organic UV absorbers, triazine derived UV absorbers are preferred. More preferred are 2,4-bis(2,4-dimethylphenyl)-6-(2-hydroxy-4-isooctyloxyphenyl)-1,3,5-triazine, 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine, 2,4-bis(2-hydroxy-4-butyloxyphenyl)-6-(2,4-bisbutyloxyphenyl)-1,3,5-triazine, and 2-[2-hydroxy-4-(1-octyloxycarbonylethoxy)phenyl]-4,6-bis(4-phenylphenyl)-1,3,5-triazine.

The organic UV absorbers may be used alone or in admixture.

In the curable composition of the invention, the organic/inorganic composite (A) and the organic UV absorber (B) are preferably combined such that 0.1 to 50 parts by weight, more preferably 1 to 30 parts by weight of the organic UV absorber (B) is present per 100 parts by weight of the organic/inorganic composite (A). If more than 50 pbw of the organic UV absorber (B) is added, the curable composition may have too low a crosslinking density so that a coating layer thereof has a lower hardness and becomes less effective for preventing the organic UV absorber from volatilizing off or running out. In addition, the coating layer can have a whitened outer appearance, and poor adhesion to the underlying substrate or the overlying polysiloxane coating. If the amount of the organic UV absorber (B) added is less than 0.1 pbw, the resulting coating may absorb less UV, failing to provide the desired weatherability.

Optional Components

In the curable composition of the invention, other components may be added if desired.

The curable composition of the invention may further comprise (C) a vinyl polymer containing a hydrolyzable silyl group and/or SiOH group. This vinyl polymer (C) can be prepared by copolymerizing (a-2) a vinyl monomer having a hydrolyzable silyl group and/or SiOH group bonded thereto through a C—Si bond and (a-3) another monomer copolymerizable therewith, as described above. The monomers (a-2) and (a-3) which can be used herein may be selected from the exemplary compounds illustrated above. From the standpoint of improved weatherability, the other monomer (a-3) is preferably selected from (meth)acrylic monomers having a UV absorbing group and (meth)acrylic monomers having a cyclic hindered amine structure and mixtures thereof.

Also, the curable composition of the invention may further comprise (D) an organosilicon compound containing a nitrogen atom and an alkoxysilyl group in the molecule. The inclusion of the nitrogen and alkoxysilyl-containing organosilicon compound has several advantages. First, it imparts water resistant adhesion to a coating layer of the curable composition. Secondly, the coating is densified since the organosilicon compound forms crosslinks with the hydrolyzable silyl groups and/or SiOH groups in the organic/inorganic composite (A). Thirdly, the nitrogen atom in the organosilicon compound promotes such crosslinking reactions for reducing the amount of residual alkoxysilyl groups within the coating layer, restraining cracks due to post-crosslinking with the passage of time, and effectively fixing the UV absorber (B) and optional light stabilizer or the like within the coating layer.

The preferred organosilicon compounds (D) are compounds containing at least one nitrogen atom and at least one alkoxysilyl group in the molecule, more preferably compounds containing at least one nitrogen atom and at least two alkoxysilyl groups in the molecule. Suitable organosilicon compounds include an amino-containing alkoxysilane, amino-containing di(alkoxysilane), amide-containing alkoxysilane, an amidated form of the reaction product of an amino-containing alkoxysilane with an epoxy-containing alkoxysilane and a silylating agent, the reaction product of an amino-containing alkoxysilane with a dicarboxylic anhydride, the reaction product of an amino-containing alkoxysilane with a (poly)(meth)acrylic compound, the reaction product of an amino-containing alkoxysilane with a (meth)acrylic group-containing alkoxysilane, the reaction product of a polyamine compound with a (meth)acrylic group-containing alkoxysilane, an amidated form of the reaction product of an amino-containing alkoxysilane with a polyisocyanate compound, and (poly)silane compound containing an isocyanurate ring. Of these, preference is given to the amidated form of the reaction product of an amino-containing alkoxysilane with an epoxy-containing alkoxysilane and a silylating agent, and the reaction product of an amino-containing alkoxysilane with a dicarboxylic anhydride.

Examples of the reactants used herein are given below. Suitable amino-containing alkoxysilanes include 3-aminopropyltrimethoxysilane, 3-aminopropyltriethoxysilane, 3-aminopropylmethyldimethoxysilane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, 3-(trimethoxysilylpropyl)aminopropyltrimethoxysilane, 3-(triethoxysilylpropyl)aminopropyltriethoxysilane, 2-(trimethoxysilylpropyl)aminoethyl-3-aminopropyltrimethoxysilane, and 2-(triethoxysilylpropyl)aminoethyl-3-aminopropyltriethoxy-silane.

A typical amino-containing di(alkoxysilane) is bis(trimethoxysilylpropyl)amine.

Suitable amide-containing alkoxysilanes include ureidopropyltrimethoxysilane, ureidopropyltriethoxysilane, ureidopropylmethyldimethoxysilane, and ureidopropylmethyldiethoxysilane.

Suitable dicarboxylic anhydrides include maleic anhydride, phthalic anhydride, tetrahydrophthalic anhydride, hexahydrophthalic anhydride, methyl-substituted tetrahydrophthalic anhydride, methyl-substituted hexahydrophthalic anhydride, 3,6-endomethylene-tetrahydrophthalic anhydride, and methyl-substituted-3,6-endomethylene-tetrahydrophthalic anhydride.

Suitable (poly)(meth)acrylic compounds include alkyl methacrylates such as methyl methacrylate, butyl methacrylate, and 2-ethylhexyl methacrylate, alkyl acrylates such as methyl acrylate, ethyl acrylate, and butyl acrylate, acrylamide, acrylonitrile, and ethylene glycol dimethacrylate.

Suitable polyamine compounds include ethylene diamine, diethylene triamine, triethylene triamine, tetraethylene pentamine, and piperazine.

Suitable polyisocyanate compounds include toluene diisocyanate, diphenyl methane diisocyanate, hexamethylene diisocyanate, 2,2,4-trimethylhexamethylene diisocyanate, 2,4,4-trimethylhexamethylene diisocyanate, p-phenylene diisocyanate, 4,4'-dicyclohexylmethane diisocyanate, 3,3'-dimethyldiphenyl-4,4'-diisocyanate, dianisidine diisocyanate, m-xylene diisocyanate, isophorone diisocyanate, 1,5-naphthalene diisocyanate, trans-1,4-cyclohexyl diisocyanate, lysine diisocyanate, dimethyltriphenylmethane tetraisocyanate, triphenylmethane triisocyanate, and tris(isocyanatophenyl) thiophosphate.

Suitable (meth)acrylic group-containing alkoxysilanes include the exemplary compounds illustrated above for the acrylic monomer having an alkoxysilyl group.

Suitable isocyanurate ring-containing silanes include tris (trimethoxysilylpropyl) isocyanurate, bis(trimethoxysilylpropyl)allyl isocyanurate, and tris(triethoxysilylpropyl) isocyanurate.

The amidated form of the reaction product of an amino-containing alkoxysilane with an epoxy-containing alkoxysilane and a silylating agent may be prepared by the following method. Examples of the amino-containing alkoxysilane used herein are as exemplified above, with N-(2-aminoethyl)-3-aminopropyltrimethoxysilane and N-(2-aminoethyl)-3-aminopropylmethyldimethoxysilane being preferred for adhesion and operation. The epoxy-containing alkoxysilane used herein is not particularly limited, with γ-glycidoxypropyltrimethoxysilane, γ-glycidoxypropylmethyldimethoxysilane, and β-(3,4-epoxycyclohexyl)ethylmethyldimethoxysilane being preferred for reactivity and operation. Examples of the silylating agent used herein include hexamethyldisilazane, N,N'-bis(trimethylsilyl)formamide, and N,N'-bis(trimethylsilyl)urea. The silylating agent serves to protect the OH group resulting from the reaction of an amino-containing alkoxysilane with an epoxy-containing alkoxysilane and to prevent the OH group from reacting with an alkoxysilyl group for thereby preventing the reaction product from changing with time.

The reaction of an amino-containing alkoxysilane with an epoxy-containing alkoxysilane and a silylating agent may be carried out by adding dropwise the epoxy-containing alkoxysilane to a mixture of the amino-containing alkoxysilane and the silylating agent and heating the system, or by reacting the amino-containing alkoxysilane with the epoxy-containing alkoxysilane and adding the silylating agent to the reaction product.

In this reaction, the amino-containing alkoxysilane and the epoxy-containing alkoxysilane are preferably combined such that the molar ratio of epoxy groups to amino groups (=N—H) may fall in a range from 0.3 to 1.2. If the molar ratio of epoxy/amino is less than 0.3, a less number of alkoxy groups per molecule may participate in crosslinking so that curability is weak, and the spread of overall molecule is contracted to weaken a surface bonding ability and exacerbate adhesion. If the ratio exceeds 1.2, there may be left few =N—H groups which are available during the subsequent amidation step, exacerbating water-resistant adhesion.

This component is an amidated form of the reaction product. Amidation may be performed by reacting the reaction product with an acid halide, acid anhydride or acid isopropenyl ester derived from carboxylic acid such as acetic chloride, acetic bromide, propionic chloride, acetic anhydride, isopropenyl acetate, and benzoyl chloride.

The reaction product of an amino-containing alkoxysilane with a dicarboxylic anhydride may be prepared by the following method. Examples of the amino-containing alkoxysilane used herein are as exemplified above, with 3-aminopropyltrimethoxysilane, 3-aminopropyltriethoxysilane, and 3-aminopropylmethyldiethoxysilane being preferred for adhesion and stability.

Examples of the dicarboxylic anhydride used herein are as exemplified above. Preferred for adhesion and stability are tetrahydrophthalic anhydride, hexahydrophthalic anhydride, methyl-substituted tetrahydrophthalic anhydride, methyl-substituted hexahydrophthalic anhydride, 3,6-endomethylene-tetrahydrophthalic anhydride, and methyl-substituted-3,6-endomethylene-tetrahydrophthalic anhydride.

The reaction of an amino-containing alkoxysilane with a dicarboxylic anhydride may be carried out by adding dropwise the amino-containing alkoxysilane to the dicarboxylic anhydride and allowing them to react, or inversely, by adding dropwise the dicarboxylic anhydride to the amino-containing alkoxysilane and allowing them to react.

In this reaction, the amino-containing alkoxysilane and the dicarboxylic anhydride are preferably combined such that the molar ratio of amino groups (—$NH_2$) to dicarboxylic anhydride may fall in a range from 0.3 to 1.8. If the molar ratio of amino/acid anhydride is less than 0.3, a less number of alkoxy groups in the reaction product may participate in crosslinking, leading to poor curability and weak adhesion. If the ratio exceeds 1.8, the shelf stability of the undercoating composition can be degraded due to amino groups available from unreacted amino-containing alkoxysilane.

In the curable composition, (E) a thermoplastic vinyl resin may be included for imparting flexibility to a curable composition coating and suppressing a phase change or softening phenomenon of a curable composition coating in response to changes of the ambient temperature, especially in a relatively high temperature range. This, in turn, suppresses strain within the curable composition coating and at the interface between the coating and the overlying layer, and as a result, prevents the overlying layer, typically organopolysiloxane based protective coating from cracking. Additionally, the thermoplastic resin (E) imparts heat resistance and water resistance to the curable composition itself.

The thermoplastic resin may be compounded in an amount of 0 to 50 parts by weight per 100 parts by weight of effective components in the curable composition and when used, preferably in an amount of 1 to 50 parts by weight. More than 50 pbw of the thermoplastic resin can reduce the crosslinking density of a coating, resulting in a reduced hardness and failing to prevent the organic UV absorber (B) from surface migration, volatilization and run-out.

To the curable composition of the invention, a light stabilizer having at least one cyclic hindered amine structure or hindered phenol structure in the molecule may be added. The inclusion of the light stabilizer improves weatherability. The light stabilizer used herein should preferably be dissolvable in the solvent used in the curable composition, compatible with the curable composition, and low volatile.

Illustrative examples of the light stabilizer include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)-pyrrolidine-2,5-dione, N-acetyl-3-dodecyl-1-(2,2,6,6-tetramethyl-4-piperidinyl)-pyrrolidine-2,5-dione, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) 1,2,3,4-butane-tetracarboxylate, tetrakis(1,2,2,6,6-pentamethyl-4-piperidyl) 1,2,3,4-butanetetracarboxylate, condensates of 1,2,3,4-butanetetracarboxylic acid, 2,2,6,6-tetramethyl-piperidinol and tridecanol, 8-acetyl-3-dodecyl-7,7,9,9-tetramethyl-1,3,8-trisazaspiro-[4,5]decane-2,4-dione, condensates of 1,2,3,4-butanetetracarboxylic acid, 1,2,6,6-pentamethyl-4-piperidinol and β,β,β,β'-tetramethyl-3,9-(2,4,8,10-tetraoxaspiro[5,5]undecane) diethanol, and condensates of 1,2,3,4-butanetetracarboxylic acid, 2,2,6,6-pentamethyl-4-piperidinol and β,β,β,β'-tetramethyl-3,9-(2,4,8,10-tetraoxaspiro[5,5]undecane)diethanol.

Also useful are light stabilizers modified with silyl for the purpose of fixing the light stabilizer as disclosed in JP-B 61-56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, 2,2,6,6-tetramethylpiperidino-4-propylmethyldiethoxysilane, and (partial) hydrolyzates thereof. These light stabilizers may be used alone or in admixture.

The light stabilizer may be compounded in an amount of 0 to 10 parts by weight per 100 parts by weight of effective components in the curable composition and when used, preferably in an amount of 1 to 10 parts by weight. More than 10 pbw of the light stabilizer can reduce the adhesion of a coating.

To the curable composition of the invention, a UV absorber other than the organic UV absorber (B) may be added. Organic UV absorbers compatible with the curable composition are preferred. Derivatives of compounds having a hydroxybenzophenone, benzotriazole, cyanoacrylate or triazine main skeleton are more preferred. Vinyl polymers having such UV absorbers on side chains are also useful. Illustrative examples include 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'- dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-methylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3-diphenyl acrylate, and 2-(2-hydroxy-4-hexyloxyphenyl)-4,6-diphenyltriazine. These UV absorbers may be used in admixture.

Moreover, a microparticulate functional metal oxide may be added to the curable composition insofar as this does not adversely affect the composition. The preferred metal oxide is one which is compatible with and dispersible in the curable composition, and when a coating is formed from the composition, maintains the coating at a certain level of transparency without clouding. Examples include titanium oxide, cerium oxide, zinc oxide, tin oxide, zirconium oxide, antimony oxide, tungsten oxide, antimony-containing tin oxide, tin-containing indium oxide, iron oxide, silica, and alumina, alone or composite metal oxide fine particles, and mixtures thereof.

The microparticulate metal oxide may be compounded in an amount of 0 to 30 parts by weight per 100 parts by weight of effective components in the curable composition and when used, preferably in an amount of 1 to 30 parts by weight. More than 30 pbw can reduce the transparency of a coating.

If desired, the curable composition is diluted with a solvent prior to use. Suitable solvents include diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetylacetone, ethyl acetate, butyl acetate, xylene, and toluene. As a general rule, the curable composition is preferably diluted with the solvent into a solution at a concentration of 5 to 20% by weight of effective components prior to use.

For smoothening a coating, an effective amount of a fluorochemical or silicone surfactant may be added. Also for promoting the cure of a coating, a catalytic amount of a crosslinking curing catalyst may be added.

On use, the curable composition solution is coated onto the surface of a previously cleaned substrate such as plastic film, and held at room temperature or heated for evaporating off the dilution solvent, forming a coating having a thickness of 0.5 to 20 µm, preferably 1 to 15 µm. Coatings of less than 0.5 µm thick may fail to provide the desired weatherability. Coatings in excess of 20 µm thick may interfere with coating operation and adversely affect the resin substrate's own mechanical and optical properties.

When the solvent is evaporated off by heating, the preferred heating continues in a range from room temperature to the heat resistant temperature of the substrate, more preferably in a range of 50 to 140° C. for 1 minute to 3 hours, more preferably 5 minutes to 2 hours.

The coating technique is not particularly limited. Useful techniques which can be used herein include roll coating, dip coating, flow coating, bar coating, spray coating, and spin coating.

Also contemplated herein is a coated plastic article comprising a plastic film or substrate and a cured coating of the inventive curable composition disposed thereon. The coated article has improved properties including initial adhesion, heat resistance, hot water resistance, and weatherability. An overcoat layer may be disposed on the curable composition coating by applying any well-known organopolysiloxane composition, for example, a hydrolyzate or co-hydrolyzate of one or more organooxysilane having the general formula (3):

$$(R^7)_m Si(OR^8)_{4-m} \quad (3)$$

wherein $R^7$ is a $C_1$-$C_{10}$ organic group, $R^8$ is hydrogen or a monovalent organic group, and m is 0, 1 or 2, and heat curing, preferably at 50 to 140° C. for 5 minutes to 3 hours. Since the molded plastic article has the inventive curable composition coated thereon, this coating and the overlying organopolysiloxane act in a synergistic fashion, offering good adhesion and wear resistance. They prevent the UV absorber from volatilizing or running out of the curable composition coating, offering good weatherability and weathering stability.

The organopolysiloxane composition is preferably coated so as to provide a coating thickness of 0.2 to 20 µm, more preferably 0.5 to 15 µm after heat curing. Too thin coatings may fail to provide the desired hardness and wear resistance. Too thick coatings may crack after curing. The coating technique is not particularly limited. Useful techniques which can be used herein include roll coating, dip coating, flow coating, bar coating, spray coating, and spin coating.

In formula (3), suitable organic groups represented by $R^7$ are substituted or unsubstituted, monovalent hydrocarbon groups of 1 to 10 carbon atoms, for example, alkyl, aryl, halogenated alkyl, halogenated aryl, alkenyl groups, and substituted forms of these hydrocarbon groups in which some hydrogen atoms are substituted by epoxy, (meth)acryloxy, mercapto, amino, or cyano groups. Also included are organic groups which are separated by a heteroatom such as O, NH or NCH$_3$. Illustrative examples include alkyl groups such as methyl, ethyl, propyl, isopropyl, butyl, hexyl, decyl, and cyclohexyl; aryl groups such as phenyl and phenethyl; halogenated alkyl groups such as 3-chloropropyl, 3,3,3-trifluoropropyl, and 3,3,4,4,5,5,6,6,6-nonafluorohexyl; halogenated aryl groups such as p-chlorophenyl; alkenyl groups such as vinyl, allyl, 9-decenyl, and p-vinylbenzyl; epoxy-containing organic groups such as 3-glycidoxypropyl, β-(3,4-epoxycyclohexyl)ethyl, and 9,10-epoxydecyl; (meth)acryloxy-containing organic groups such as γ-methacryloxypropyl and γ-acryloxy; mercpto-containing organic groups such as γ-mercaptopropyl and p-mercaptomethylphenylethyl; amino-containing organic groups such as γ-aminopropyl and (β-aminoethyl)-γ-aminopropyl; and cyano-containing organic groups such as β-cyanoethyl.

$R^8$ is hydrogen or a monovalent organic group of 1 to 10 carbon atoms, examples of which include alkyl, alkenyl, alkoxyalkyl, and acyl groups, with the alkyl and acyl groups being preferred. Examples include methyl, ethyl, propyl, isopropyl, butyl, hexyl, phenyl, isopropenyl, methoxyethyl, and acetyl.

Illustrative examples of the silane compounds satisfying the above requirements include trialkoxysilanes or triacyloxysilanes such as methyltrimethoxysilane, methyltriethoxysilane, methyltris(2-methoxyethoxy)silane, methyltriacetoxysilane, methyltripropoxysilane, methyltriisopropenoxysilane, methyltributoxysilane, ethyltrimethoxysilane, ethyltriethoxysilane, vinyltrimethoxysilane, vinyltriethoxysilane, vinyltriacetoxysilane, vinyltris(2-methoxyethoxy)silane, vinyltriisopropenoxysilane, phenyltrimethoxysilane, phenyltriethoxysilane, phenyltriacetoxysilane, γ-chloropropyltrimethoxysilane, γ-chloropropyltriethoxysilane, γ-chloropropyltripropoxysilane, 3,3,3-trifluoropropyltrimethoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltrimethoxysilane, β-(3,4-epoxycyclohexyl)ethylmethyldiethoxysilane, γ-methacryloxypropyltrimethoxysilane, γ-acryloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-(β-aminoethyl)-γ-aminopropyltrimethoxysilane, and β-cyanoethyltrimethoxysilane;

dialkoxysilanes or diacyloxysilanes such as dimethyldimethoxysilane, dimethyldiethoxysilane, dimethyldi(2-methoxyethoxy)silane, dimethyldiacetoxysilane, dimethyldipropoxysilane, dimethyldiisopropenoxysilane, dimethyldibutoxysilane, vinylmethyldimethoxysilane, vinylmethyldiethoxysilane, vinylmethyldiacetoxysilane, vinylmethyldi(2-methoxyethoxy)silane, vinylmethyldiisopropenoxysilane, phenylmethyldimethoxysilane, phenylmethyldiethoxysilane, phenylmethyldiacetoxysilane, γ-propylmethyldimethoxysilane, γ-propylmethyldiethoxysilane, γ-propylmethyldipropoxysilane, 3,3,3-trifluoropropylmethyldimethoxysilane, γ-methacryloxypropyltrimethoxysilane, γ-acryloxypropyltrimethoysilane, γ-aminopropylmethyldimethoxysilane, γ-aminopropylmethyldiethoxysilane, γ-mercaptopropylmethyldimethoxysilane, γ-mercaptopropylmethyldiethoxysilane, N-(β-aminoethyl)-γ-aminopropylmethyldimethoxysilane, and β-cyanoethylmethyldimethoxysilane; and tetraalkoxysilanes such as methyl silicate, ethyl silicate, N-propyl silicate, n-butyl silicate, sec-butyl silicate, and t-butyl silicate.

One or more of these silane compounds may be used and subjected to (co)hydrolysis, and (co)hydrolyzates of these silane compounds may be used alone or in admixture.

The (co)hydrolyzate of the foregoing silane compound may be obtained by adding water to a lower alcohol solution of the silane compound and effecting hydrolysis in the presence of an acid catalyst. Suitable lower alcohols include methanol, ethanol, isopropanol, and butanol. A solvent can be used in combination with the alcohol, and examples of such solvent include ketones such as acetone and acetylacetone, esters such as ethyl acetate and isobutyl acetate, and ethers such as propylene glycol monomethyl ether, dipropylene glycol monomethyl ether and diisopropyl ether.

To the organopolysiloxane composition, a colloidal silica in the form of a dispersion of silica fine particles of 1 to 100 nm dispersed in water or an alcohol (e.g., methanol, ethanol, isobutanol, propylene glycol monomethyl ether) may be added in an amount of 5 to 70% by weight. Coating of this colloidal silica-laden organopolysiloxane composition is more preferable because of a further improvement in mar resistance.

The addition of colloidal silica may be carried out either by simply adding it to the organopolysiloxane composition or by premixing it with the silane compound and effecting hydrolysis. Alternatively, in the case of a water-dispersed colloidal silica, the water in the water-dispersed colloidal silica may be utilized as part or the entirety of water necessary for the hydrolysis of the silane compound whereby the hydrolysis is effected.

A UV absorber can be added to the organopolysiloxane composition. Exemplary inorganic UV absorbers which can be added include titanium oxide, cerium oxide, zinc oxide, tin oxide, zirconium oxide, antimony oxide, tungsten oxide, antimony-containing tin oxide, tin-containing indium oxide, iron oxide, silica, and alumina, alone or composite metal oxide fine particles, and mixtures thereof; metal chelates of titanium, zinc, zirconium or the like, and (partial) hydrolyzates and condensates thereof. Exemplary organic UV absorbers which can be added include derivatives of compounds having a hydroxybenzophenone, benzotriazole, cyanoacrylate or triazine main skeleton, and (co)polymers, typically vinyl polymers, having such UV absorbers on side chains.

To the organopolysiloxane composition, a curing catalyst may be added in a catalytic amount. Suitable curing catalysts include quaternary ammonium salts, alkali metal salts of organic acids, alkoxides or chelates of aluminum, titanium, chromium or iron, perchlorate salts, acid anhydrides, polyamines, and Lewis acids.

The curable composition of the invention is applicable to a variety of plastic materials, typically polycarbonate resins, polystyrene resins, (meth)acrylic resins, urethane resins, thiourethane resins, polycondensates of halogenated bisphenol A and ethylene glycol, acrylic urethane resins, halogenated aryl-containing acrylic resins, sulfur-containing resins, and composite laminates including two or more layers of these resins.

Plastic materials coated with silicone hard coatings can be advantageously used as optical members because of their excellent optical properties.

EXAMPLE

Synthesis Examples, Examples, and Comparative Examples are given below for further illustrating the invention although the invention is not limited thereto. In Examples, all parts (pbw) and percents are by weight. The viscosity is measured at 25° C. in accordance with JIS Z8803. The weight average molecular weight (Mw) is determined by gel permeation chromatography (GPC) versus polystyrene standards.

[Synthesis of (a-1) Vinyl Monomer Having a Hydrolyzable Group-Containing Polysiloxane Member Bonded to a Side Chain through a C—Si Bond]

Synthesis Example 1

A 2-L flask equipped with a stirrer, condenser and thermometer was charged with 234 g of γ-acryloxypropyltrimethoxysilane and 500 g of methanol. Under a nitrogen stream, the flask was cooled to 5° C., to which 18.0 g of 0.2N acetic acid was added dropwise over 15 minutes while the liquid temperature was maintained below 10° C. After the completion of dropwise addition, stirring continued for one hour at room temperature. Then, 1520 g of tetramethoxysilane was added. Stirring continued for 2 hours at room temperature and for a further 8 hours at 60° C. The volatile matter was removed from the reaction solution, which was subjected to precision distillation, collecting 1-(γ-acryloxypropyl)-1,1,3,3,3-pentamethoxydisiloxane (M-1) in a yield of 67%.

Synthesis Example 2

A flask was charged with 216 g of γ-methacryloxypropyldimethylmethoxysilane and 500 g of methanol. Under a nitrogen stream, the flask was cooled to 5° C., to which 18.0 g of 0.2N acetic acid was added dropwise over 15 minutes while the liquid temperature was maintained below 10° C. After the completion of dropwise addition, stirring continued for one hour at room temperature. Then, 2260 g of 1,3-dimethyl-1,1,3,3-tetramethoxydisiloxane was added. Stirring continued for 2 hours at room temperature and for a further 8 hours at 60° C. The methanol and volatile matter were removed from the reaction solution by heating in vacuum, obtaining 1-(γ-methacryloxypropyl)-3,5-dimethyl-3,5,5-trimethoxytrisiloxane (M-2) in a yield of 82%.

[Synthesis of Organosilicon Compound Containing a Nitrogen Atom and a Hydrolyzable Silyl Group in the Molecule]

Synthesis Example 3

A 2-L flask equipped with a stirrer, condenser and thermometer was charged with 222 g of N-2-(aminoethyl)-3-aminopropyltrimethoxysilane and 242 g of hexamethyldisilazane as a silylating agent. Under a nitrogen stream, the flask was heated to 120° C., to which 496 g of γ-glycidoxypropylmethyldiethoxysilane was added dropwise for reaction. The reaction solution was heated and stirred at 120° C. for 5 hours, after which a low boiling fraction was removed at 100° C. under a reduced pressure, obtaining 862 g of a viscous compound having a viscosity of 1,387 mpa·s.

Next, a 2-L flask equipped with a stirrer, condenser and thermometer was charged with 862 g of the reaction product and 862 g of toluene. Under a nitrogen stream, 143 g of acetic anhydride was added dropwise to the solution at room temperature. The reaction solution was heated and stirred at 110° C. for 2 hours, after which 141 g of methanol was added dropwise to the reaction solution at 50° C. The reaction solution was heated and stirred at 50° C. for 1 hour, after which a low boiling fraction was removed at 100° C. under a reduced pressure, obtaining a red brown, clear, highly viscous compound.

The compound was analyzed by IR absorption spectroscopy, observing no absorption peaks attributable to OH or NH group in the region equal to or greater than 3,000 cm$^{-1}$, but a sharp absorption peak attributable to amide group at 1,650 cm$^{-1}$.

The compound was diluted with propylene glycol monomethyl ether (PGM) to a nonvolatile concentration of 25% (JIS K6833). It is a solution of nitrogen and alkoxysilyl-containing compound, designated NSi-1.

[Synthesis of (A) Organic/Inorganic Composite in which a Hydrolyzable Silyl Group-Containing Polysiloxane Member is Bonded to a Vinyl Polymer through a C—Si Bond]

Synthesis Example 4

A 2-L flask equipped with a stirrer, condenser and thermometer was charged with 152 g of diacetone alcohol as a solvent and heated at 80° C. under a nitrogen stream. To the flask, a 240-g portion of a previously prepared monomer mix solution (containing 67 g of 2-[2'-hydroxy-5'-(2-methacryloxyethyl)phenyl]-2H-benzotriazole under the trade name of RUVA-93 from Otsuka Chemical Co., Ltd., 90 g of M-1 in Synthesis Example 1, 270 g of methyl methacrylate, 23 g of glycidyl methacrylate, and 350 g of diacetone alcohol), and a 54-g portion of a previously prepared solution of 2.3 g of 2,2'-azobis(2-methylbutyronitrile) as a polymerization initiator in 177.7 g of diacetone alcohol were added in sequence. The solution was allowed to react at 80° C. for 30 minutes, after which the remainder of the monomer mix solution and the remainder of the initiator solution were simultaneously added dropwise at 80-90° C. over 1.5 hours. Stirring continued at 80-90° C. for a further 5 hours.

The thus obtained solution of a vinyl polymer having an alkoxy-containing polysiloxane member bonded to a side chain via a C—Si bond had a viscosity of 8,100 mpa·s, and the copolymer contained 15% of the UV-absorbing monomer and 20% of the vinyl monomer having an alkoxy-containing polysiloxane member bonded to a side chain via a C—Si bond. The copolymer had a Mw of 81,000 as measured by GPC versus polystyrene standards. This solution of the organic/inorganic composite having an alkoxy-containing polysiloxane member bonded to a side chain through a C—Si bond is designated Pol-1.

Synthesis Examples 5 to 7

Organic/inorganic composite solutions were prepared as in Synthesis Example 4 in accordance with the monomer formulation and amount shown in Table 1. The vinyl polymers in solution form are designated Pol-2 to 4, respectively.

Synthesis Example 8

Synthesis was carried out as in Synthesis Example 4 except that 25 g of γ-methacryloxypropyltrimethoxysilane was used instead of M-1 in Synthesis Example 4, and in accordance with the monomer formulation and amount shown in Table 1. There was obtained a solution of a vinyl polymer (precursor) having a trimethoxysilyl group bonded to a side chain via a Si—C bond.

This precursor solution was then cooled to 5° C., to which 0.9 g of 0.2N acetic acid was added dropwise over 15 minutes while the liquid temperature was maintained below 10° C. After the completion of dropwise addition, stirring continued for one hour at room temperature for driving hydrolysis to completion.

A 2-L flask equipped with a stirrer, condenser and thermometer was charged with 300 g of NSi-1 of Synthesis Example 3, to which the hydrolytic solution of the vinyl polymer was added, with stirring under a nitrogen stream and at room temperature. Reaction occurred at room temperature for one hour, yielding a solution of an organic/inorganic composite having a nitrogen and alkoxy-containing polysiloxane member bonded to a side chain through a C—Si bond, designated Pol-5.

Comparative Synthesis Example 1

A solution of a trimethoxysilyl-containing vinyl polymer was prepared as in Synthesis Example 4 in accordance with the monomer formulation and amount shown in Table 1. The vinyl polymer in solution form is designated Pol-R.

TABLE 1

| | | Composition of organic/inorganic composite (unit: pbw) | | | | | |
|---|---|---|---|---|---|---|---|
| | | Synthesis Example | | | | | Comparison |
| | | 4 | 5 | 6 | 7 | 8 | 1 |
| | Pol No | 1 | 2 | 3 | 4 | 5 | R |
| a1 | M-1 | 90 | | 23 | 160 | | |
| | M-2 | | 45 | | | | |
| a2 | MPTMS | | | 9 | | 25 | 45 |
| a3 | RUVA-1 | 67 | 36 | | | 67 | 67 |
| | RUVA-2 | | | 67 | | | |
| | MMA | 270 | 341 | 283 | 244 | 270 | 315 |
| | GMA | 23 | 23 | 45 | | 23 | 23 |
| | EA | | | 23 | 23 | | |

TABLE 1-continued

Composition of organic/inorganic composite (unit: pbw)

|  | Synthesis Example ||||| Comparison |
|---|---|---|---|---|---|---|
|  | 4 | 5 | 6 | 7 | 8 | 1 |
| VIAc |  |  |  | 23 |  |  |
| MHALS |  | 5 |  |  |  |  |
| NSi-1 (solids) |  |  |  |  | (75) |  |
| Total charge | 450 | 450 | 450 | 450 | 460 | 450 |

MPTMS: γ-methacryloxypropyltrimethoxysilane
RUVA-1: 2-[2'-hydroxy-5'-(2-methacryloxyethyl)phenyl]-2H-benzotriazole under the trade name of RUVA-93 from Otsuka Chemical Co., Ltd.
RUVA-2: 2-hydroxy-4-(2-acryloxyethyl)benzophenone under the trade name of BP-1A from Osaka Organic Chemical Industry, Ltd.
MMA: methyl methacrylate
GMA: glycidyl methacrylate
EA: ethyl acrylate
VIAc: vinyl acetate
MHALS: 1,2,2,6,6-pentamethyl-4-piperidyl methacrylate

[Synthesis of Colloidal Silica-Laden Organopolysiloxane Composition]

Synthesis Example 9

A 1-L flask equipped with a stirrer, condenser and thermometer was charged with 336 g of methyltriethoxysilane and 94 g of isobutanol. To the solution which was stirred under ice cooling and kept below 5° C., 283 g of water-dispersed colloidal silica (Snowtex O, Nissan Chemical Industries Ltd., average particle size 15-20 nm, $SiO_2$ content 20%) below 5° C. was added. The mixture was stirred under ice cooling for 3 hours and at 20-25° C. for a further 12 hours, after which 27 g of diacetone alcohol and 50 g of propylene glycol monomethyl ether were added. Then 3 g of a 10% sodium propionate aqueous solution and 0.2 g of a polyether-modified silicone KP-341 (Shin-Etsu Chemical Co., Ltd.) as a leveling agent were added, followed by adjustment to pH 6-7 with acetic acid. It was diluted with isobutanol to a nonvolatile content of 20% (JIS K6833) and aged at room temperature for 5 days, yielding a colloidal silica-laden organopolysiloxane composition having a viscosity of 4.2 mm$^2$/s and a Mw of 1,100. This colloidal silica-laden organopolysiloxane composition is designated HC-1.

Synthesis Example 10

A 2-L flask equipped with a stirrer, condenser and thermometer was charged with 328 g of methyltrimethoxysilane and 10 g of 3,3,3-trifluoropropyltrimethoxysilane. To the solution which was stirred and kept at 20° C., 98 g of water-dispersed colloidal silica (Snowtex O, Nissan Chemical Industries Ltd., average particle size 15-20 nm, $SiO_2$ content 20%) and 230 g of 0.25N acetic acid were added. The mixture was stirred for 3 hours and at 60° C. for a further 3 hours, after which 300 g of cyclohexanone was added. The by-product methanol was distilled off under atmospheric pressure. Then 400 g of isopropanol, 134 g of an isopropanol solution of 0.25% tetrabutylammonium hydroxide, and 0.5 g of a polyether-modified silicone KP-341 (Shin-Etsu Chemical Co., Ltd.) as a leveling agent were added. There was yielded a colloidal silica-laden organopolysiloxane composition having a viscosity of 4.3 mm$^2$/S and a Mw of 2,300. This colloidal silica-laden organopolysiloxane composition is designated HC-2.

Below, exemplary curable compositions are given for further illustrating the invention. While many abbreviations are used in Examples and Comparative Examples, those which have not described in Synthesis Examples have the following meaning.

<Nitrogen and Alkoxysilyl-Containing Compound>
NSi-1: the compound synthesized in Synthesis Example 3

<Thermoplastic Resin>
Pol-C: 40% diacetone alcohol solution of poly(methyl methacrylate) resin, Dianal® BR-80, Mitsubishi Rayon Co., Ltd.

<Organic UV Absorber>
UVA-1: 2-[2-hydroxy-4-(1-octyloxycarbonylethoxy)phenyl]-4,6-bis(4-phenylphenyl)-1,3,5-triazine (Tinuvin 479, Ciba Specialty Chemicals,
Molecular weight: 678
Weight retentivity on 150° C./24 hr/open holding: 98%
UVA-2: 10% diacetone alcohol solution of a copolymer of 2-(2'-hydroxy-5'-methacryloxyethylphenyl)-2H-benzotriazole (30%) and methyl methacrylate (70%), PUVA-30M, Otsuka Chemical Co., Ltd.
Mw: 10,000
Weight retentivity on 150° C./24 hr/open holding (after removal of diacetone alcohol solvent at 100° C. in vacuum): 97%

<Inorganic UV Absorber>
UVA-3: 10% isobutanol dispersion of microparticulate cerium oxide, U-100, Tagi Chemical Co., Ltd.

<Hindered Amine Light Stabilizer>
HALS-1: N-acetyl-3-dodecyl-1-(2,2,6,6-tetramethyl-4-piperidinyl)pyrrolidine-2,5-dione (Sandbar 3058Liq, Clariant)

The measurement of physical properties and evaluation were carried out by the following methods.

Tests for evaluation were carried out on a single film obtained by coating and curing the curable composition to a substrate, and on a layer laminate obtained by coating and curing the curable composition (also referred to as undercoat) to a substrate and then coating, curing and laminating a colloidal silica-laden organopolysiloxane composition thereon.

(1) Initial Coating Appearance

For both the single film of curable composition and the laminate of the curable composition layer and the organopolysiloxane composition layer, the appearance of the coating was visually observed.

(2) Primary Adhesion

A cross-hatch adhesion test was carried out according to JIS K5400 by scribing a test sample with a cutting edge along six (each) longitudinal and transverse lines spaced apart 2 mm to define 25 square sections, closely attaching a commercial pressure-sensitive adhesive tape, and rapidly peeling the adhesive tape at 90°. The number (X) of sections retained without peeling is counted and expressed as X/25.

(3) Water Resistance and Water-Resistant Adhesion

A test sample was immersed in boiling water for 2 hours, after which the outer appearance was visually observed and the cross-hatch adhesion test was carried out as in (2).

(4) Mar Resistance

The Taber abrasion test was carried out according to ASTM D1044 (Taber abrader, CS-10F wheel, 500 gram load, 500 cycles). Haze was measured prior to the test and after the test. Mar resistance (%) is the haze after the test minus the haze prior to the test.

(5) Weathering Test

Using the Eye-Super UV tester of Iwasaki Electric Co., Ltd., a weathering test in which each cycle consists of [black panel temperature 63° C., relative humidity 50%, irradiance 50 mW/cm$^2$, wet 10 sec/hour, 5 hours] and [black panel temperature 30° C., relative humidity 95%, 1 hour] was repeated for 250 hours and 500 hours. Prior to and after the weathering test, yellowing index was measured according to JIS K7103. The weathering resistant coating was observed for cracks and separation by the naked eyes and under a microscope (magnifying power ×250).

Crack

The outer appearance of the coating after the weathering test was evaluated according to the following criterion.

○: intact
Δ: some cracks
X: cracks over the entire coating

Separation

The state of the coating after the weathering test was evaluated according to the following criterion.

○: intact
Δ1: partial separation between the organopolysiloxane layer and the undercoat layer
Δ2: partial separation between the undercoat layer and the substrate
X1: entire separation between the organopolysiloxane layer and the undercoat layer
X2: entire separation between the undercoat layer and the substrate Examples 1-6 and Comparative Examples 1-3

The compositions blended in accordance with the formulation shown in Tables 2 and 3 were diluted with a solvent mixture of diacetone alcohol and propylene glycol monomethyl ether in a weight ratio of 20/80 to a total solids concentration of 10%, prior to coating.

Each of the curable compositions prepared above was applied by dip coating to a surface cleaned polycarbonate resin plate of 0.5 mm thick (Iupilon® sheet, Mitsubishi Engineering-Plastics Corp.) and heat cured at 120° C. for 30 minutes to form a (cured) undercoat of about 6 to 8 μm thick. In some cases, a mixture of the colloidal silica-laden organopolysiloxane composition (HC-1 or 2) of Synthesis Example 9 or 10 and a UV absorber (UVA-3) and a light stabilizer (HALS-1) as additives was applied by dip coating to the undercoat and heat cured at 130° C. for 1 hour to form a topcoat of about 4 to 5 μm thick. The coatings were evaluated for physical properties, with the results shown in Tables 2 and 3.

TABLE 2

Composition (as solids) and coating properties

| | Example | | | | | |
|---|---|---|---|---|---|---|
| | 1 | 2 | 3 | 4 | 5 | 6 |
| A) Organic/inorganic composite | Pol-1 100 pbw | Pol-2 100 pbw | Pol-3 100 pbw | Pol-4 100 pbw | Pol-5 100 pbw | Pol-5 100 pbw |
| B) Organic UV absorber | UVA-1 2 pbw | UVA-1 5 pbw | UVA-2 15 pbw | UVA-2 30 pbw | UVA-1 5 pbw | UVA-2 15 pbw |
| C) Alkoxysilyl-containing vinyl polymer | | | | | | Pol-R 10 pbw |
| D) (N + alkoxysilyl)-containing organosilicon compound | | Nsi-1 20 pbw | Nsi-1 30 pbw | Nsi-1 20 pbw | | |
| E) Thermoplastic resin | | | | Pol-C 10 pbw | | |
| Additive | HALS-1 1 pbw | | | HALS-1 1 pbw | | HALS-1 1 pbw |
| Colloidal silica-laden organopolysiloxane composition | | | HC-1 100 pbw | HC-1 100 pbw | HC-1 100 pbw | HC-2 100 pbw |
| Additive | | | | UVA-3 3 pbw | UVA-3 6 pbw | |

Evaluation results

| | | | | | | |
|---|---|---|---|---|---|---|
| Initial coating appearance | intact | intact | intact | intact | intact | intact |
| Primary adhesion | 25/25 | 25/25 | 25/25 | 25/25 | 25/25 | 25/25 |
| Water resistant appearance | intact | intact | intact | intact | intact | intact |
| Water resistant adhesion | 25/25 | 25/25 | 25/25 | 25/25 | 25/25 | 25/25 |
| Mar resistance (%) | 19 | 21 | 2 | 6 | 3 | 4 |
| Weathering 250 hr Yellowing index | <1 | <1 | <1 | <1 | <1 | <1 |
| Cracks | ○ | ○ | ○ | ○ | ○ | ○ |
| Separation | ○ | ○ | ○ | ○ | ○ | ○ |
| Weathering 500 hr Yellowing index | 2 | 3 | 6 | 1 | 1 | 1 |
| Cracks | ○ | ○ | ○ | ○ | ○ | ○ |
| Separation | Δ2 | ○ | ○ | ○ | ○ | ○ |

TABLE 3

Composition (as solids) and coating properties

| | Comparative Example | | |
|---|---|---|---|
| | 1 | 2 | 3 |
| A) Organic/inorganic composite | Pol-1 100 pbw | | |
| B) Organic UV absorber | | UVA-1 5 pbw | UVA-1 10 pbw |
| C) Alkoxysilyl-containing vinyl polymer | | Pol-R 100 pbw | |

TABLE 3-continued

Composition (as solids) and coating properties

|  | Comparative Example | | |
|---|---|---|---|
|  | 1 | 2 | 3 |
| D) (N + alkoxysilyl)-containing organosilicon compound |  |  | Nsi-1 10 pbw |
| E) Thermoplastic resin |  |  | Pol-C 100 pbw |
| Additive | HALS-1 1 pbw |  |  |
| Colloidal silica-laden organopolysiloxane composition |  | HC-1 100 pbw | HC-1 100 pbw |
| Additive |  | UVA-3 3 pbw |  |

Evaluation results

| | | | | |
|---|---|---|---|---|
| Initial coating appearance | | intact | intact | intact |
| Primary adhesion | | 25/25 | 25/25 | 25/25 |
| Water resistant appearance | | intact | intact | intact |
| Water resistant adhesion | | 25/25 | 25/25 | 25/25 |
| Mar resistance (%) | | 20 | 2 | 3 |
| Weathering 250 hr | Yellowing index | 4 | 5 | 3 |
| | Cracks | ○ | ○ | Δ |
| | Separation | Δ2 | Δ1 | X1 |
| Weathering 500 hr | Yellowing index | 21 | 23 | 10 |
| | Cracks | Δ | X | X |
| | Separation | X2 | X1 | X2 |

Japanese Patent Application No. 2006-051756 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A curable composition comprising:
   (A) an organic/inorganic composite in which a hydrolyzable silyl group and/or SiOH group-containing polysiloxane is bonded to a vinyl polymer through a Si—C bond; and
   (B) an organic UV absorber having a molecular weight of at least 500 and a weight retentivity of at least 95% when held at 150° C. for 24 hours in an open state, wherein
     (i) the organic/inorganic composite (A) is obtained through copolymerization of monomeric components comprising (a-1) a vinyl monomer and (a-3) another monomer,
       wherein said vinyl monomer (a-1) is obtained through condensation or cohydrolytic condensation of a silane compound selected from the group consisting of methacryloxypropyltrimethoxysilane, methacryloxypropylmethyldimethoxysilane, methacryloxypropyldimethylmethoxysilane, methacryloxypropyltriethoxysilane, methacryloxymethyltrimethoxysilane, methacryloxyundecyltrimethoxysilane, acryloxypropyltrimethoxysilane, acryloxypropylmethyldimethoxysilane, acryloxypropyldimethylmethoxysilane, acryloxypropyltriethoxysilane, acryloxymethyltrimethoxysilane, and acryloxyundecyltrimethoxysilane, and an organosilicon compound selected from the group consisting of $Si(OCH_3)_4$, $Si(OCH_2CH_3)_4$, MeO—Si(Me)$_2$—O—Si(OMe)$_3$ and MeO—Si(Me)$_2$—O—Si(Me)$_2$—O—Si(OMe)$_3$ wherein Me stands for methyl,
       said (a-3) another monomer is a combination of (a) a (meth)acrylate or a derivative thereof and (b) a (meth)acrylic monomer having a UV absorbing group and/or a (meth)acrylic monomer having a cyclic hindered amine structure, or
     (ii) the organic/inorganic composite (A) is obtained through partial hydrolytic condensation of a vinyl polymer and an organosilicon compound,
       wherein said vinyl polymer is obtained through copolymerization of monomeric components comprising (a-2) a vinyl monomer and (a-3) another monomer,
       said (a-2) a vinyl monomer is selected from the group consisting of methacryloxypropyltrimethoxysilane, methacryloxypropylmethyldimethoxysilane, methacryloxypropyldimethylmethoxysilane, methacryloxypropyltriethoxysilane, methacryloxymethyltrimethoxysilane, methacryloxyundecyltrimethoxysilane, acryloxypropyltrimethoxysilane, acryloxypropylmethyldimethoxysilane, acryloxypropyldimethylmethoxysilane, acryloxypropyltriethoxysilane, acryloxymethyltrimethoxysilane, and acryloxyundecyltrimethoxysilane, and
       said (a-3) another monomer is a combination of (a) a (meth)acrylate or a derivative thereof and (b) a (meth)acrylic monomer having a UV absorbing group and/or a (meth)acrylic monomer having a cyclic hindered amine structure, and
       said organosilicon compound is selected from the group consisting of $Si(OCH_3)_4$, $Si(OCH_2CH_3)_4$, MeO—Si(Me)$_2$—O—Si(OMe)$_3$ and MeO—Si(Me)$_2$—O—Si(Me)$_2$—O—Si(OMe)$_3$ wherein Me stands for methyl.

2. The curable composition of claim 1, further comprising a light stabilizer having at least one cyclic hindered amine structure or hindered phenol structure.

3. The curable composition of claim 1, wherein said organic UV absorber (B) is a triazole compound, a triazine compound or a mixture thereof.

4. The curable composition of claim 3, wherein said organic UV absorber (B) is 2-[2-hydroxy-4-(1-octyloxycarbonylethoxy)phenyl]-4,6-bis(4-phenylphenyl)-1,3,5-triazine.

5. The curable composition of claim 1, further comprising (C) a vinyl polymer containing hydrolyzable silyl groups and/or SiOH groups.

6. The curable composition of claim 5, wherein component (C) is one obtained by copolymerizing (a-2) a vinyl monomer having a hydrolyzable silyl group and/or SiOH group bonded thereto through a C—Si bond and (a-3) another monomer copolymerizable therewith.

7. The curable composition of claim 1, further comprising (D) an organosilicon compound containing a nitrogen atom and an alkoxysilyl group in the molecule.

8. The curable composition of claim 7, wherein the organosilicon compound (D) is an amidated form of the reaction product of an amino-containing alkoxysilane with an epoxy-containing alkoxysilane and a silylating agent, or a reaction product of an amino-containing alkoxysilane with a dicarboxylic anhydride.

9. The curable composition of claim 1, further comprising (E) a thermoplastic vinyl resin.

10. An article comprising:
a substrate; and
a coating formed thereon by coating a the curable composition of claim 1.

11. An article comprising:
a substrate;
an undercoat formed on the substrate by coating and curing a the curable composition of claim 1,
and a silicon hard coating disposed on the surface of the undercoat.

* * * * *